UNITED STATES PATENT OFFICE.

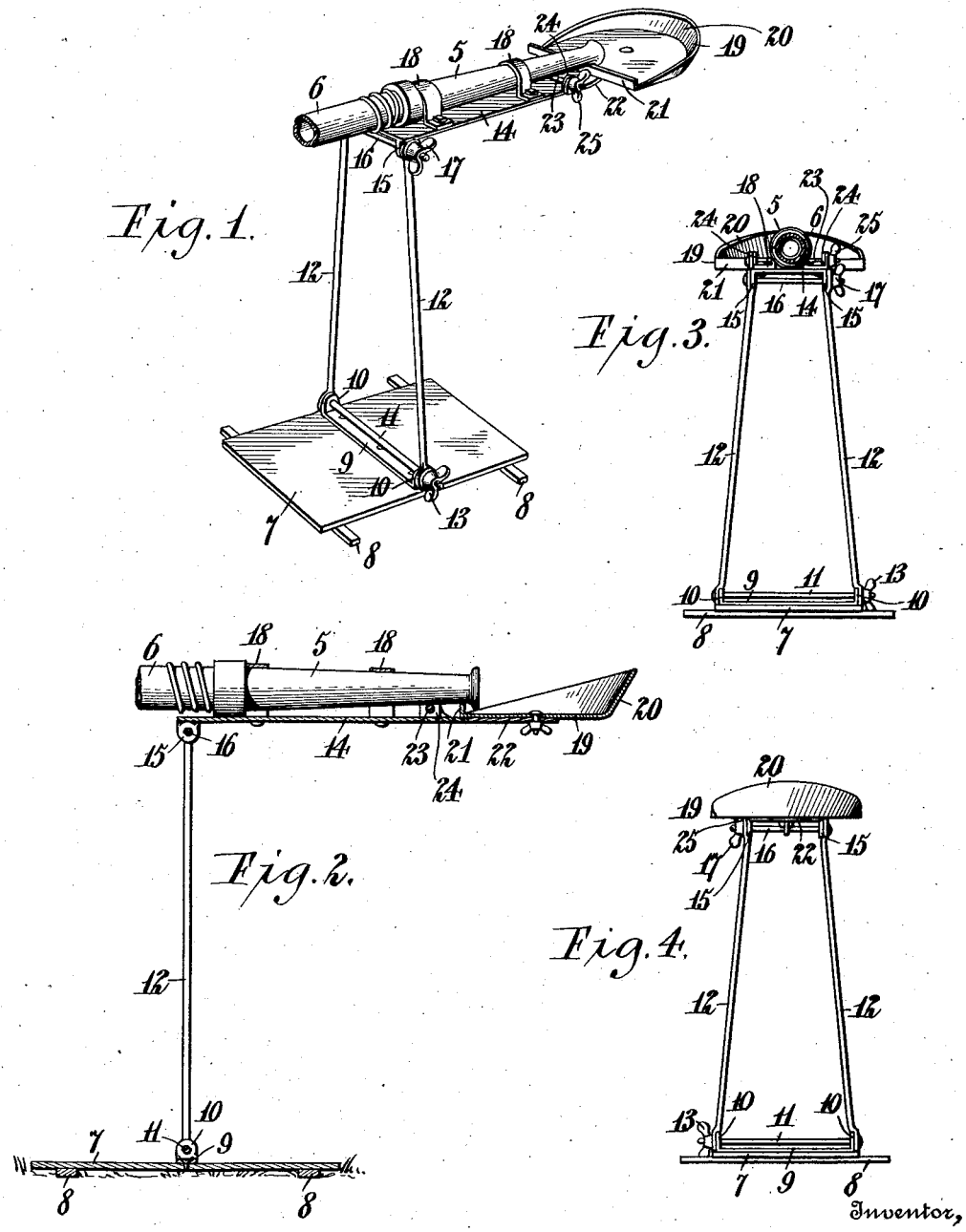

ARTIE MARTIN, OF DEVORE, CALIFORNIA.

LAWN-SPRINKLER.

1,009,540. Specification of Letters Patent. Patented Nov. 21, 1911.

Application filed March 21, 1911. Serial No. 615,838.

*To all whom it may concern:*

Be it known that I, ARTIE MARTIN, a citizen of the United States, residing at Devore, in the county of San Bernardino and State of California, have invented new and useful Improvements in Lawn-Sprinklers, of which the following is a specification.

The invention relates to lawn sprinklers, and more particularly to the class of sprinkling attachments for hose nozzles.

The primary object of the invention is the provision of an attachment of this character in which water issuing from a hose nozzle will be deflected, so as to break up the currents of water for the spreading thereof, and finally dividing it into drops, whereby the water may be scattered uniformly upon the ground.

Another object of the invention is the provision of an attachment of this character in which the nozzle of a watering hose may be supported and the water issuing therefrom will be spread for forming a spraying stream, which will be scattered in the air and fall in drops upon the ground, the attachment being adjustable to alter the direction of the water columns.

A further object of the invention is the provision of an attachment in which the nozzle of a watering hose can be held, and adjusted at varying angles.

A still further object of the invention is the provision of an attachment of this character which is simple in construction, thoroughly reliable and efficient in operation, and inexpensive in manufacture.

In the drawings Figure 1 is a perspective view of a watering nozzle and the attachment for supporting the same constructed in accordance with the invention. Fig. 2 is a vertical longitudinal sectional view through the attachment. Fig. 3 is an end view thereof. Fig. 4 is a front elevation thereof.

Similar reference characters indicate corresponding parts throughout the several views of the drawings.

Referring to the drawings by numerals, 5 designates a watering hose nozzle of the ordinary well-known construction, the same being mounted upon one end of a watering hose 6, only a portion thereof being shown for the sake of illustration. The nozzle 5 is mounted in a sprinkling attachment, as will be hereinafter more fully described.

The sprinkling attachment comprises a base or platform 7, to the under face of which are fixed cross cleats 8, the ends of which project beyond the side edges of the platform 7, the said cleats 8 being secured near opposite ends of the said platform 7 and are adapted to rest upon the ground to prevent the tilting of the platform while the sprinkling attachment is in use and supporting the nozzle 5 of the hose.

Fixed to the upper face of the platform 7 transversely thereof is a U-shaped iron 9, the upturned free ends 10 of which form bearing ears, through which is passed a pivot rod 11, the same being also passed through upwardly converging adjustable supporting legs 12, the rod, at one end, being formed with a suitable head, while its opposite end carries a knurled binding nut 13. Thus, on the tightening of the latter, the legs 12 may be locked in adjusted position, as will be clearly obvious.

Connected with the upper ends of the supporting legs 12 is a forwardly extending nozzle holding extension or deck 14, upon which is mounted the nozzle 5, the deck, at its rear end, being formed with downturned ears 15, through which is passed a pivot rod or pin 16, the same being similar to the rod 9, and is passed through the upper ends of the legs 12, the rod 16 being provided with a binding nut 17 threaded on one end thereof, so that upon the tightening of the nut 17, the nozzle supporting deck 14 may be held in adjusted position. It is evident that the deck 14 may be arcuately adjusted in a vertical direction, so that its free end may be elevated or lowered, with respect to the ground.

Engaged about the nozzle 5 and detachably secured in the deck 14 are clips 18 which removably connect the nozzle 5 with the said deck. These clips 18 are of the usual well-known construction, and enable the nozzle 5 to be attached to and removed from the deck 14 at the will of the user of the hose.

Adjustably mounted at the free end of the deck 14, forwardly of the discharge extremity of the nozzle 5, is a sprinkling pan 19 which is of substantially segmental-shape, the rounded forward edge thereof being upturned to form a deflecting wing or fan 20, against which strikes the water stream flowing from the nozzle 5 of the hose. The rear straight edge of the pan 19 is upturned, as at 21, and centrally connected to the under face of the pan is a rearwardly extending arm 22, through which is passed a pivot pin 23, the same being also passed through upturned bearing ears 24 formed at the free end of the deck 14, the arm 22 being disposed between the said ears 24. Thus, it will be seen that the pan 19 may be swung up or down in an arcuate direction, so as to face the water stream issuing from the nozzle 5 or lie out of the path of said stream. This pivot pin 23 carries a binding nut 25 which permits the pan 19 to be locked in its adjusted position. As will be clearly obvious, the pan 19 may be adjusted at varying angles, so as to alter the water current issuing from the nozzle 5 to increase the spreading of the water column, whereby it may be finely divided on the impact of the jet of water against the pan 19, breaking the water column into drops, so that the same may be scattered uniformly over the ground.

What is claimed is:

A sprinkling attachment, comprising a base having spaced parallel cross struts on its under face, a U-shaped bracket fixed medially upon the upper face of the base, upwardly converging legs, an adjusting screw passed through the lower ends of the legs and the bracket for pivotally connecting the said legs thereto, a nozzle supporting deck pivotally connected to the upper ends of the legs, yokes fixed to the deck in spaced relation to each other and adapted to receive a hose nozzle, and a rotatably and vertically adjustable deflector pan connected with the forward end of the deck and having an arcuate shaped upturned rearwardly inclined marginal flange to be struck by a water stream for the spreading thereof when issuing from such hose nozzle.

In testimony whereof I affix my signature in presence of two witnesses.

ARTIE MARTIN.

Witnesses:
ROBT. M. McHARGUE,
C. K. BROOKS.